Figure 1:
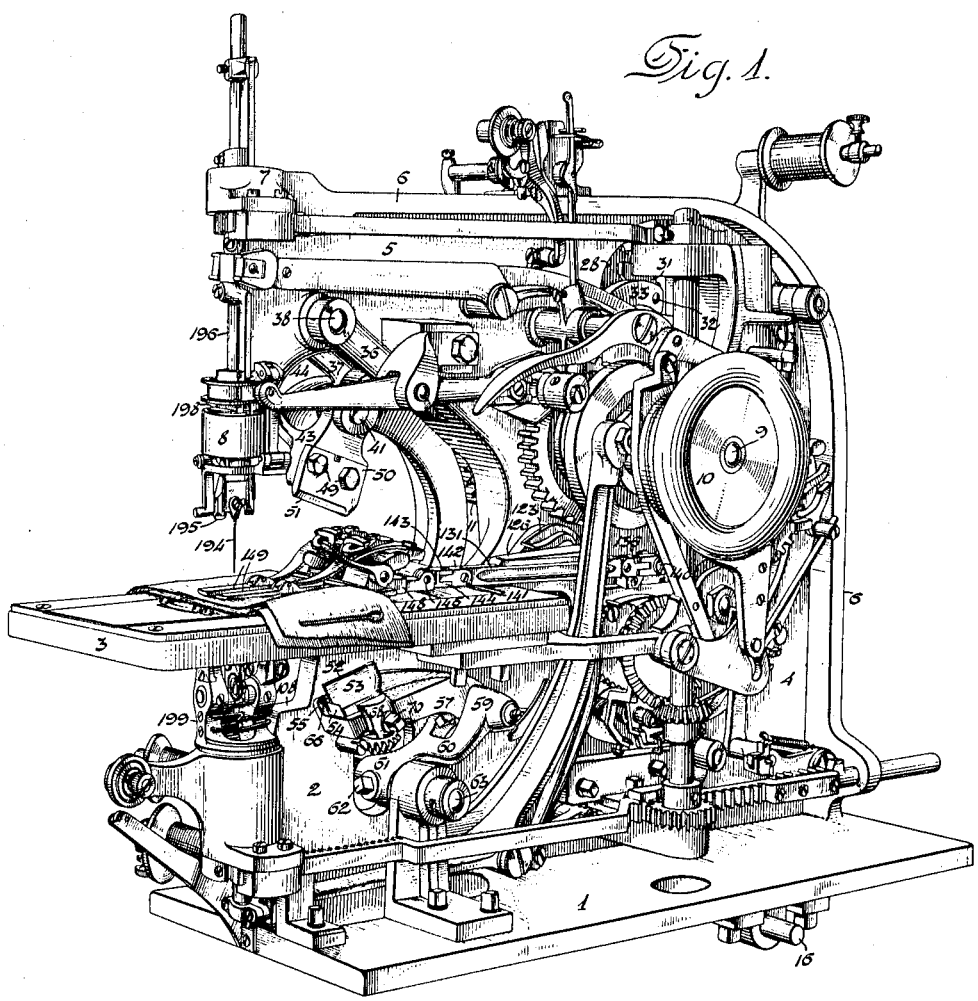

J. G. GREENE & L. F. A. BÜCHNER.
BUTTONHOLE CUTTING MECHANISM.
APPLICATION FILED DEC. 13, 1910.

1,035,344.

Patented Aug. 13, 1912.

3 SHEETS—SHEET 1.

WITNESSES:

INVENTOR

ATTORNEY

J. G. GREENE & L. F. A. BÜCHNER.
BUTTONHOLE CUTTING MECHANISM.
APPLICATION FILED DEC. 13, 1910.

1,035,344.

Patented Aug. 13, 1912.
3 SHEETS—SHEET 2.

J. G. GREENE & L. F. A. BÜCHNER.
BUTTONHOLE CUTTING MECHANISM.
APPLICATION FILED DEC. 13, 1910.
1,035,344.
Patented Aug. 13, 1912.
3 SHEETS—SHEET 3.
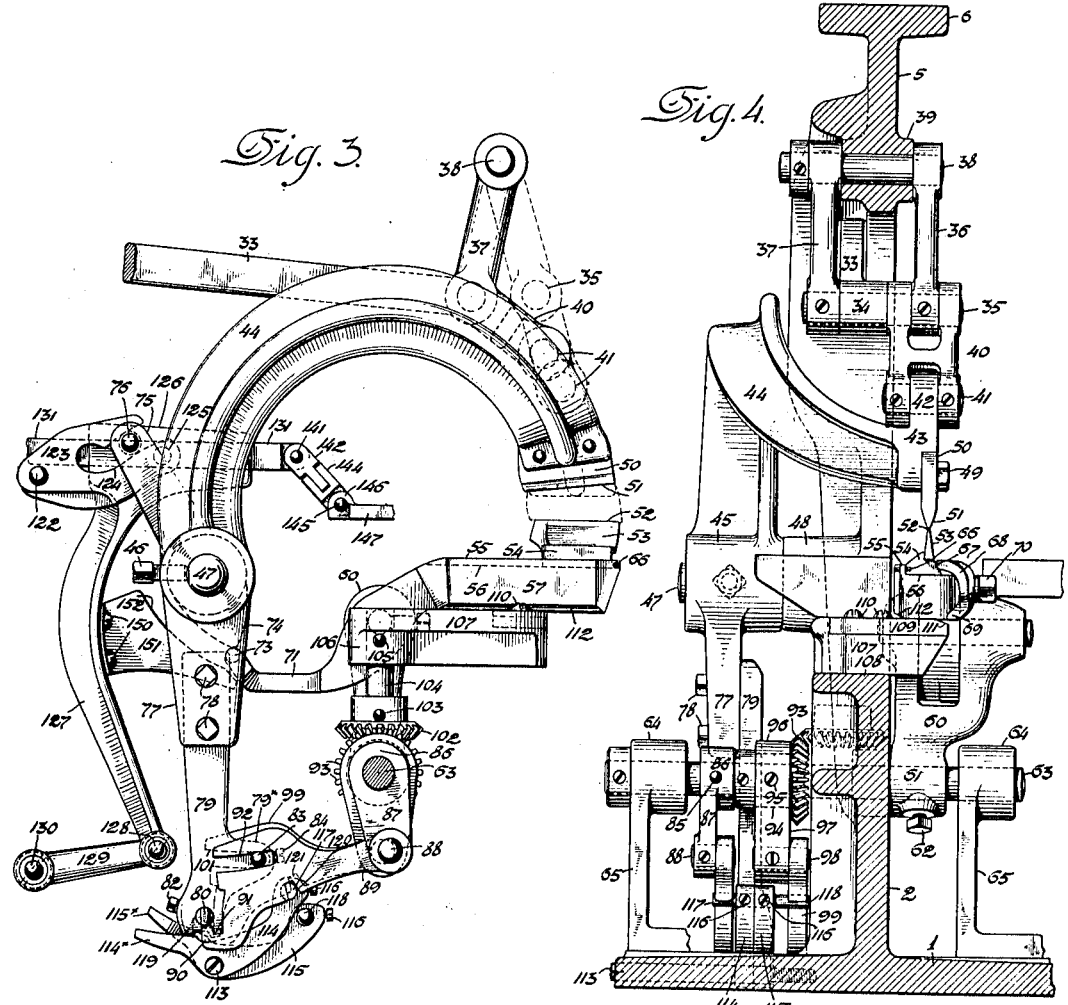
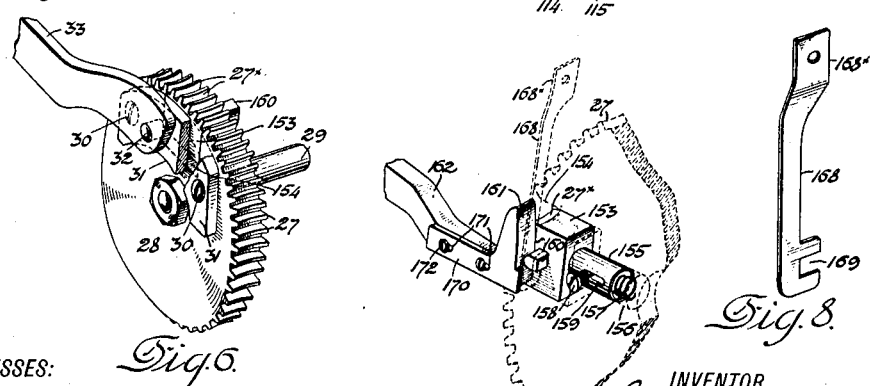

UNITED STATES PATENT OFFICE.

JAMES G. GREENE AND LOUIS F. A. BÜCHNER, OF ELIZABETH, NEW JERSEY, ASSIGNORS TO THE SINGER MANUFACTURING COMPANY, A CORPORATION OF NEW JERSEY.

BUTTONHOLE-CUTTING MECHANISM.

1,035,344.     Specification of Letters Patent.     Patented Aug. 13, 1912.

Application filed December 13, 1910. Serial No. 597,113.

*To all whom it may concern:*

Be it known that we, JAMES G. GREENE and LOUIS F. A. BÜCHNER, citizens of the United States, residing at Elizabeth, in the county of Union and State of New Jersey, have invented certain new and useful Improvements in Buttonhole-Cutting Mechanism, of which the following is a specification, reference being had therein to the accompanying drawings.

This invention has for its primary object to provide a buttonhole cutting mechanism in which the thrust of the coöperating cutting members is transmitted directly to the upper and lower members of the machine frame in substantial alinement with the cutting members and the direction of their cutting action; and to provide an effective mechanism for attaining this object.
According to the present invention, the frame of the machine is constructed with rigidly connected upper and lower members and affords supports for movable carriers of the upper and lower cutting members for which actuating means are provided including a plurality of members movable into and out of alinement with the cutter members and forming, when in such alined relation, direct composite braces or stays between each of the cutting members and its respective frame member, so as to provide at the completion of each cutting action a direct and continuous connection between, and to transmit the thrust of the cutting operation to, the upper and lower frame members.

The machine is preferably constructed with a rock-lever fulcrumed upon a transverse rock-shaft mounted in the frame and having an arched upper arm carrying the upper cutter-member and operated from a crank upon the cutter-actuating shaft through a connection including a toggle whose component links are pivotally connected respectively with the upper frame member and the cutter-carrying arm of the rock-lever. The lower cutter member is mounted upon the laterally extending arm of a second rock-lever having a fulcrum journaled in a swinging support or hanger and having a second arm adapted to be rocked in a vertical plane by means of a cam upon the rock-shaft affording the fulcrum for the upper-cutter carrying rock-lever. The rock-lever carrying the upper cutter has a depending arm provided with oppositely extending lateral studs normally entering coupling notches in two links pivotally connected respectively with crank-arms upon a rock-shaft, one of which is operatively connected with and adapted to advance the traveling support or hanger of the lower cutter-carrier, while the other crank-arm is operatively connected with a spacing or thrust-sustaining block which it interposes between the lower frame member and the lower cutter which it serves to rigidly sustain in transmitting the thrust of the upper cutter in performing its function directly to the lower frame member. The connection between the depending arm of the upper cutter carrying rock-lever and the links to which it is coupled is such that in the continued movement of such rock-lever the lower cutter is first moved from retracted position to advance operative position in the path of movement of the upper cutter and the spacing or thrust-sustaining block is thereafter interposed between the lower cutter and the lower frame member. Special means are provided for arresting the movement of the cutter-actuating shaft after each complete rotation, so as to insure against the performance of more than one cutting operation in succession and between successive stitching operations.

The invention will be understood by reference to the accompanying drawings, in which—

Figure 5:
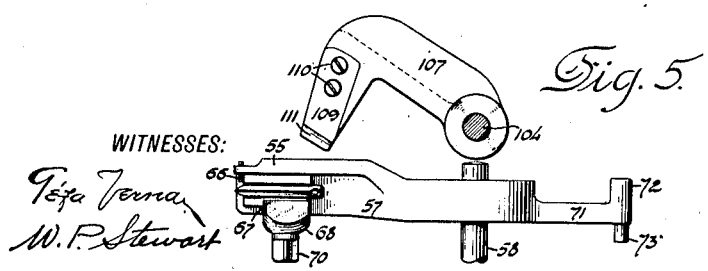
Figure 2:
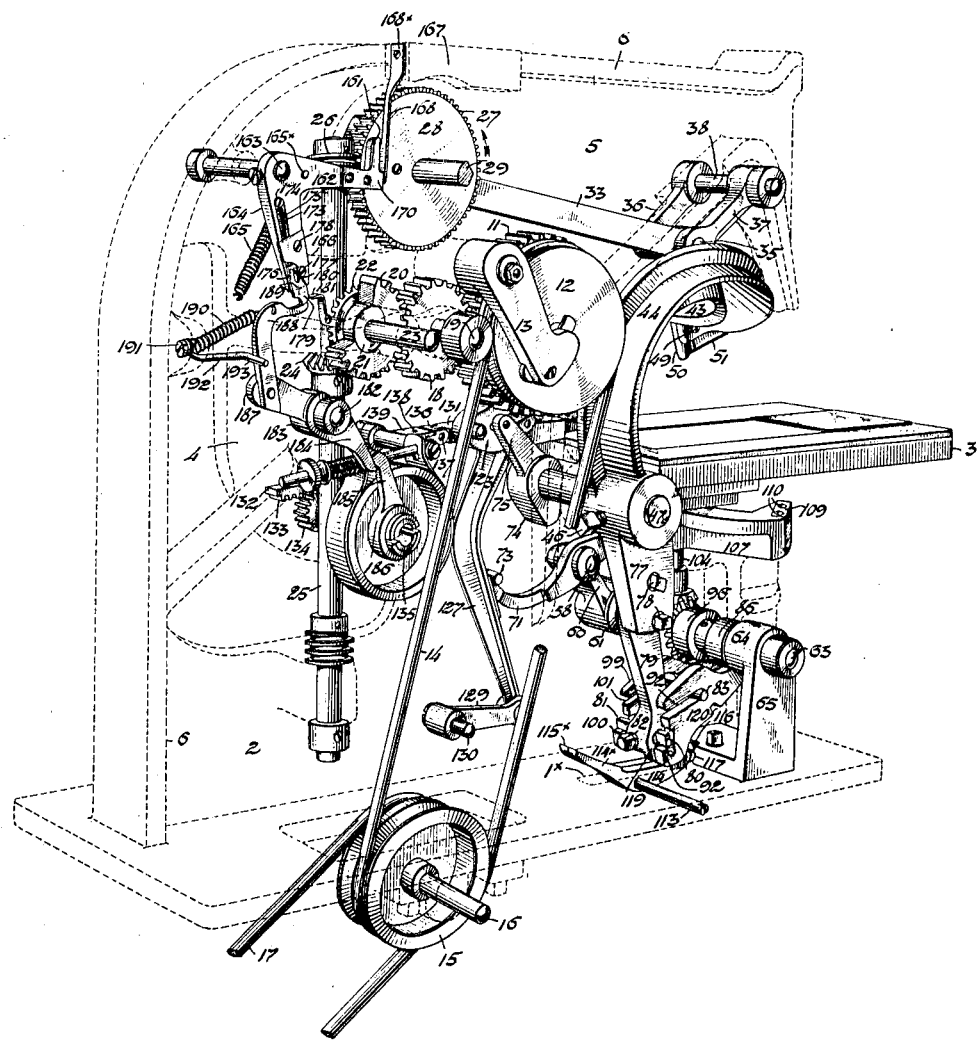

Figure 1 is a perspective view, taken from one side, of a buttonhole cutting and stitching machine embodying the present improvements, and Fig. 2 a similar view of the machine taken from the opposite side and with the frame represented in dotted lines and certain parts unessential to the present improvement omitted. Fig. 3 is a rear side elevation of the cutting mechanism detached and Fig. 4 a front end elevation of the same showing its relation to the frame of the machine. Fig. 5 is a plan of the lower cutter and its carrier and the spacing or thrust-sustaining block with its carrier in retracted position. Figs. 6 and 7 are perspective views showing the connection between the actuating member of the toggle device and the operating crank upon the cutter-shaft, with the clutch device for insuring the arrest of the cutter-shaft at the end of each complete rotation, and Fig. 8 a detail side elevation of a member of said clutch device.

As represented in the drawings, the machine is constructed with a frame comprising a bed-plate 1 from which rises a vertical web in the form of a thick plate cut out in the forward portion to form the lower base member 2 supporting the fixed work-plate 3, the standard 4 and overhanging arm 5 constituting the upper frame member which latter, with the standard 4, is strengthened by the rib 6 extending from the rear of the bed-plate upwardly and forwardly to the upper boss 7 affording one of the bearings for the rotary needle-bar bushings, the other of which is journaled in the lower bearing boss 8.

The stitch-forming and feeding mechanisms are or may be constructed substantially as shown and described in our United States Patent No. 949,729, dated February 15, 1910, and our pending application Serial No. 576,639, filed August 11, 1910, respectively.

Journaled in suitable bearings in the standard 4 is the transverse main or driving shaft 9 from which the stitch-forming and feeding mechanisms derive their operative movements. The main-shaft has fixed upon its forward end the hand-wheel 10 and upon its rearward end a clutch-wheel having the peripheral gear-teeth 11 adjacent which is the loose clutch-wheel 12 adapted to be forced into operative relation therewith by means of the clutch-lever 13 provided with suitable actuating means. The clutch-wheel 12 is provided with a peripheral groove adapted to receive the driving belt 14 extending from the double grooved pulley 15 upon a countershaft 16 driven by a belt 17 from the source of power.

Meshing with the peripheral gear teeth 11 of the driving clutch-wheel is an idler pinion 18 journaled upon a stud 19 mounted upon the machine frame and meshing with a pinion 20 fixed upon the hub 21 of a bevel pinion 22 mounted upon the stud 23 carried by the machine frame, said bevel pinion meshing with a similar pinion 24 fixed upon the upright worm-shaft 25 journaled in suitable bearings of the frame and provided at its upper end with a worm 26 meshing with the peripheral worm-wheel teeth 27 of the crank-disk 28 mounted upon the transverse cutter-shaft 27 which is journaled upon the standard of the bracket-arm.

To the forward face of the crank-disk 28 is secured by means of screws 30 a segmental plate 31 carrying the crank-pin 32 embraced by the apertured rearward end of a pitman 33 having at its opposite end the perforated boss 34 embraced by and pivotally connected by means of the pin 35 with a pair of links 36 and 37 mounted upon the transverse fulcrum-pin 38 journaled in a boss 39 of the upper frame member 5. The lower end of the link 36 is embraced by and pivotally connected by means of the pin 35 with the forked upper end of the link 40 whose similarly forked and apertured opposite end embraces and is pivotally secured by means of the pin 41 to an upwardly projecting lug 42 upon the head 43 of an arched and laterally offset arm 44 of the upper-cutter carrying rock-lever having its hub 45 fixed by means of the set-screw 46 upon the transverse rock-shaft 47 journaled in the bearing boss 48 of the machine frame. The links 36 and 37 form, with the forked link 40 connected thereto by the pivotal pin 35, an actuating toggle operated by the crank-pin 32 through the pitman 33 to rock the arm 44 upon and with the supporting rock-shaft 47 serving as its fulcrum.

Let into a suitable recess in the face of the head 43 of the upper-cutter carrying lever, and secured therein by means of the screws 49, is the block 50 having its lower operative edge 51 tapered and shaped into substantially the form of a buttonhole to afford a flat seat for the cutting edge 52 of the lower knife 53 formed upon the upwardly tapering block 54 having one of its edges resting against the flange 55 extending along one edge of a seat 56 formed upon the top of the forwardly extending arm 57 of a rock-lever journaled upon the fulcrum-pin 58 between the spaced members 59 of a hanger 60 having its hub 61 fixed by means of the set-screw 62 upon the rock-shaft 63 which is journaled in bearing bosses 64 of the pedestals 65 secured upon the machine base 1. The flange 55 of the rock-lever arm 57 carries a lateral stop-pin 66 for engagement with the adjacent end of the lower cutter-block 54 whose inclined front side is engaged by the rounded extremity 67 of an arched clamp-plate 68 whose opposite extremity 69 rests upon the side of the arm 57 against which and the block 54 it is forced by means of the clamp-screw 70 passing through the clamp-plate 68 and tapped into the arm 57, thus serving to secure the lower cutter firmly in position upon its carrying arm 57.

The lower-cutter carrying rock-lever has a backwardly extending arm 71 provided with laterally extending studs 72 and 73, the former of which is adapted for engagement by a cam 74 fixed upon the rock-shaft 47 and provided with a radial arm 75 carrying a lateral pin 76, the purpose of which will be later described. As the arm 44 is rocked to move the upper cutter 50 into engagement with the work, the turning of the supporting rock-shaft 47 causes the cam 74 to force the stud 72 downwardly so as to tilt the lower-cutter carrying rock-lever upon its fulcrum 58 to raise the lower cutter 53 to the level at which it coöperates with the upper cutter in performing a cutting operation.

The upper-cutter carrying rock-lever has a depending arm 77 to which is secured by means of the screws 78 an extension 79 carrying near its lower end a clutch-pin having laterally extending flattened end portions 80 and 81 and secured in position in the lever extension 79 by means of the set-screw 82. The member 79 also has a forwardly projecting ear 79× carrying a guide pin 83 secured in a transverse aperture therein by means of the set-screw 84 and extending laterally from both faces of said ear. Fixed upon the rock-shaft 63 by means of a pin 85 is the hub 86 of a crank-arm 87 carrying a fulcrum-pin 88 embraced by the apertured forward extremity of the link 89 having at its rearward extremity near its lower edge a lug 90 formed in the upper edge with a notch 91 loosely fitted to the pin-extension 80 but of less depth. The link 89 is also provided with a curved cam-slot 92 embracing the pin-extension 83 of the arm 79 and slightly eccentric to the rock-shaft 47. As the upper-cutter carrying arm 44 is moved upon its fulcrum 47 to lower the cutter 50, the arm 79 acts through its clutch-pin 80 and the notched lug 90 of the link 89 to turn the crank-arm 87 by which the rock-shaft 63 is turned so as to move the hanger 60 forwardly to shift the cutter 53 from retracted inoperative position into register with the cutter 50, and the lower-cutter carrying rock-lever is tilted by the action of the cam 74 to move the lower-cutter 53 upwardly toward the upper cutter.

Loosely mounted upon the shaft 63 is a bevel-gear 93 having secured upon its hub 94 by means of the set-screw 95 the hub 96 of a crank-arm 97 carrying the fulcrum-pin 98 embraced by the apertured forward extremity of the link 99 having at its rearward extremity near its lower edge a lug 100 formed in the upper edge with a notch similar to that in the lug 90 and adapted to receive the pin-extension 81 but of less depth. The link 99 is also provided with a curved cam-slot 101 embracing the adjacent end of the pin 83 carried by the lever-arm 79 and slightly eccentric but in a less degree than the cam-slot 92, to the rock-shaft 47, so that in the rearward movement of the lever-arm 79 the action of the pin 83 will be earlier upon the link 89 than the link 99, so as to successively disengage their respective notched lugs from the pin-extensions 80 and 81 for a purpose which will presently appear. The bevel pinion 93 meshes with a similar pinion 102 having its hub fixed by means of the pin 103 upon the lower end of a vertical shaft 104 suitably journaled in the machine frame and having secured to its upper end by means of the pin 105 the hub 106 of a swinging arm 107 whose lower edge rests upon a flat horizontal seat 108 formed upon the top of the base member 2 of the frame near the vertical plane of operation of the buttonhole cutting members. The arm 107 has let into its upper face near the outer extremity the wearing plate 109 secured thereon by means of the screws 110 and beveled at 111 in its forward upper edge correspondingly with the adjacent lower edge 112 of the lower-cutter carrying arm 57. In the backward movement of the lever-arm 79 the action of the pin 83 upon the cam-slot 92 causes the disengagement of the lug 90 from the pin-extension 80 before the lever-arm reaches extreme backward position, whereby the lateral movement of the hanger 60 in bringing the lower cutter into register with the upper cutter is completed while the lever-arm 79 is still in engagement with the link 99. As the arm 79 nears the completion of its backward movement, the pin-extension 81 becomes similarly disengaged from the notched lug 100. The consequent advance of the arm 107 from retracted position into operative position beneath the lower cutter, as represented in Fig. 4, is completed just before the cutter-carrying arm 44 completes its operative movement, so that the spacing or thrust-sustaining block formed by the arm 107 and wearing piece 109 interposes itself between the forward end of the lever-arm 57 beneath the cutter 53 and the fixed seat 108 of the frame for direct transmission of the final pressure of the upper cutter upon the lower cutter to the lower member of the frame.

The bed-plate 1 is provided at one side of the frame-member 2 with a longitudinal aperture 1× in which are pivoted upon the common fulcrum screw-pin 113 two forwardly extending locking levers 114 and 115 each having secured by means of a set-screw 116 in a transverse aperture therein a laterally extending pin 117 and 118 respectively of angular cross-section. Each of these levers has a tail 114× and 115× whose upper edge has a curvature concentric with the rock-shaft 47 in its operative position, the former being adapted for engagement with a projection 119 at the lower end of the lever 79 and the other being adapted to engage the extremity of said lever somewhat above the projection 119.

In the advance position of the arm 79, its lower extremity lies directly above the locking levers 114 and 115 which are held in their lower positions with their tails upwardly inclined, as represented in Fig. 2. As the swinging arm 79 moves backwardly during a cutting operation, the projection 119 first engages the adjacent end of the tail 114× to tilt the lever 114 upon its fulcrum-pin 113 so as to bring the lateral pin or tooth 117 into a notch 120 formed in the lower edge of the link 89 within which it is maintained during the continued movement of the lever 79 in contact with the tail 114×, the pin-extension 80 having been disengaged from the notched lug 90 before the seating of the pin 117 within its notch 120 of the link 89. The locking lever 114 thus affords a means of holding the link 89 securely in position while disengaged from the pin-extension 80. As the lever 79 continues its movement, and just preparatory to disengagement of the pin-extension 81 from the notched lug 100 of the link 99, the extremity of the lever adjacent the projection 119 engages the tail 115ˣ of the locking lever 115 which acts similarly thereon to enter the lateral pin or tooth 118 into a notch 121 of said link, thereby retaining the latter securely in position while disengaged from the lever 79.

By the means just described, not only is the lower cutter 53 held positively in register with the upper cutter 50, but the thrust-sustaining block is similarly locked in operative position just before the action of the cutters upon the work.

Fulcrumed upon the frame of the machine by means of the stud 122 is a cam-block 123 formed with a cam-slot 124 which is entered by the pin 76 carried by the vibratory arm 75 upon the rock-shaft 47. The outer portion of the cam-slot 124 in the raised position of the block 123 is concentric with the rock-shaft 47, the inner end of such slot being curved upwardly so that the backward movement of the pin 76 causes the downward movement of the block into normal lower position where it is maintained during the stitching of the buttonhole and the inaction of the cutting mechanism. At the end opposite the stud 122, the block 123 has a transverse aperture entered by a lateral pin 125 upon the head 126 of a bar 127 connected at its opposite end by means of the pin 128 with the outer end of a swinging arm 129 fulcrumed upon a screw-stud 130 tapped into the machine frame. The head of the bar 127 is formed with a transverse slideway to receive a section 131 of the work-clamp actuating rack-bar whose rearward section 132, suitably guided in bearings upon the standard 4, is provided with rack-teeth 133 meshing with a pinion 134 fixed upon a transverse shaft 135 to which operative movements in opposite directions are imparted by suitable means, as described more fully in the pending application Serial No. 576,639, before mentioned. The rack-bar sections 131 and 132 have a double hinged connection comprising a block 136 having a vertical fork embracing and pivotally connected by means of the transverse pin 137 with a vertical tongue at the end of the section 131; and the block 136 has at the rearward end a horizontal tongue embraced by and pivotally connected by means of a vertical pin 138 with a fork at the forward end of a block 139 whose vertically tongued rearward end is connected by means of the pivotal screw 140 with an ear upon the toothed section 132. The forward end of the rack-bar section 131 is similarly provided with a vertical tongue embraced by and pivotally connected by means of the transverse screw-pin 141 with the forked rearward end of a block 142 having upon its forward end a horizontal tongue which is in turn embraced by and pivotally secured by means of the pin 143 within a fork at the rearward end of a second block 144 having a vertical tongue embraced by and pivotally secured by means of the transverse pin 145 within spaced ears 146 of a rearwardly extending member 147 of the work-clamp frame 148 slidingly mounted upon the work-plate 3 and having a lower work-receiving member upon which the work is clamped by means of the upper jaws 149.

When the cutting mechanism is in inoperative position with the upper-cutter carrying arm 44 raised, the arm 75 is in its rearward position and the pin 76 in the inner end of the cam-slot 124, so as to maintain the bar 127 in lower position, wherein the rack-bar section 131 is maintained in substantial alinement with the extreme pivotal pins 140 and 145 for transmission of the operative movements of the pinion 134, constituting the feed-wheel, directly to the work-clamp. In the initial closing movement of the upper cutter, the turning of the rock-shaft 47 causes the advance of the pin 76 in the cam-slot 124 and into the concentric portion of the latter, as represented in Fig. 3 to raise the intermediate rack-bar section 131 above its normal position where it is maintained during the completion of the cutting operation and the initial retractive movement of the cutting members. The elevation of the rack-bar section 131 out of alinement with the parts which it connects produces the shortening of the effective length of the rack-bar, and as the then stationary feed-wheel 134 holds the toothed rack-bar section 132 against movement, it follows that the intermediate section 131 causes the temporary retraction of the work-clamp out of normal initial stitching position for presenting the work to the cutting members rearward of the needle, thereby obviating interference between the stitch-forming and cutting mechanisms and rendering unnecessary the temporary displacement of parts of the stitch-forming mechanism or the needle-throat preparatory to the cutting operation.

To insure against the overthrow of the lower-cutter carrying rock-lever, and to support the same in and during its movement from initial retracted position to operative relation with the cam 74, the rack-section controlling bar 127 has secured thereto by means of the screws 150 a cam-plate 151 whose operative edge 152 is substantially concentric with but spaced from the adjacent edge of the cam 74 when these parts are in the operative position represented in Fig. 3, the cam-edge 152 being engaged by the pin 73 of the rock-lever arm 71 for such purpose.

Several of the peripheral teeth 27ˣ of the annular series of the crank-disk 28 are formed upon a radially yielding spring-pressed slide-block 153, as represented in Figs. 6 and 7, and the worm-wheel is cut away upon one side to form a radial slot 154 for reception of said slide-block. The slide-block has upon the inner end a boss 155 slidingly fitted within a radial socket 156 formed in the worm-wheel and between the inner end of which and the opposite end of an aperture in the boss 155 is interposed the spring 157 for normally pressing the worm-wheel section or block 153 outwardly into register with the adjacent peripheral teeth, its range of motion being limited by means of the stop-screw 158 extending through the side of the worm-wheel into the socket 156 and entering a longitudinal slot 159 in the boss 155 whose ends it is adapted to engage.

The slide-block 153 is provided with a lateral lug 160 whose outer wedge-shaped extremity is normally engaged by the cammed extremity 161 of the laterally extending arm 162 of an angle-lever fulcrumed upon the stud 163 and having a depending arm 164. The arm 162 is drawn downwardly by means of the spring 165 attached to the frame at one end and to a pin 165ˣ upon the arm 162 at the opposite end, so as to be normally held downwardly upon the top of the upper bearing lug 166 of the worm-shaft 25. Fixed upon the lug 167 projecting from the rib 6 at the top of the frame is the foot 168ˣ of a spring detent arm 168 whose enlarged lower end is provided in one edge with a notch 169 normally embracing the lug 160 of the yielding worm-wheel section 153 in its inner or retracted position, when engaged with the heel of the cammed extremity 161 of the lever-arm 162. The lifting of the lever-arm 162 by means presently to be described, acts to disengage the lug 160 from the lower end of the cam-member 161 and thus permits the worm-wheel section 153 to spring outward into operative engagement with the worm 26 whereby rotary motion is imparted to the worm-wheel. As the worm-wheel nears the completion of a rotation, the lug 160 engages the upper end of the cammed end 161 of the lever-arm 162 on its return to initial lowered position, and is gradually forced inwardly so as to disengage the toothed section 153 from the worm, the lug 160 at the same time swinging the yielding arm 168 backwardly until it comes into register with the holding notch at the end of a complete rotation, when the arm 168 snaps into normal position wherein it embraces and securely holds the lug 160 to prevent the further turning of the worm-wheel. The opposite face of the arm 168 then rests against the adjacent end of the stop-plate 170 having the alined screw-apertures 171 entered by the fastening screws 172 by which it is adjustably secured upon the side of the lever-arm 162. It will thus be seen that the notched operative end of the spring arm 168 first snaps over the lug 160 to lock the worm-wheel from further movement at the end of a rotation, while the disengagement of such lug from the cam-member 161 permits the same to escape from the holding notch 169 for a succeeding operation.

The lever-arm 164 has a longitudinal recess 173 in the upper end of which is confined by means of the screw 174 one end of a spring 175 whose opposite end engages the inner extremity of a latch-plate 176 confined within a slideway formed in the face of the arm 174 by means of a cover-plate 177 secured thereon by screws 178. The latch-plate 176 is formed in its lower end with a nose 179 having an abrupt shoulder upon its rearward edge and rounded upon the opposite edge, and its endwise movement is limited by engagement of the opposite ends of a longitudinal slot 180 therein with one of the screws 177 passing through the same. Arranged adjacent the extreme forward position of the latch-plate is a stationary stripping finger 181 secured upon a bearing bracket projecting from the frame, and adapted to engage the beveled forward portion of the latch-plate when in extreme position to force the same upwardly in opposition to the spring 175 for disengagement from its actuating member.

Mounted upon a fixed fulcrum-stud 182 is the hub 183 of the controlling rock-lever having a depending arm 184 normally lying in the path of movement of the tappet arm 185 whose hub 186 is fixed upon the rearward end of the feed-wheel shaft 135. The controlling rock-lever has a forwardly extending arm 187 carrying an extension 188 having a forwardly projecting nose 189 adapted to engage the rearward shoulder of the latch-plate nose 179. The extension member 188 is normally drawn backwardly by means of a spring 190 attached thereto at one end and at the opposite end to a fastening screw 191 upon the machine frame which serves also to secure in position the foot of a bent wire 192 having at its forward end a transverse arm 193 serving as a stop against which the member 188 is normally held by the spring 190.

Fig. 2 represents substantially the normal position of the parts of the cutter-controlling mechanism just described, the feed-pinion 134 and rack-section 132 occupying their initial positions at the beginning or end of a buttonhole stitching operation, the tappet arm 185 of the feed-shaft being in extreme rearward position and in contact with the arm 184 of the controlling rock-lever, the extension 188 of whose other arm is in advance position beneath the nose of the latch-plate 176, in which positions these several parts continue until the beginning of the stitching succeeding the cutting operation just inaugurated to complete a buttonhole. The work having been clamped in the work-holder and the stitching mechanism started, the initial movement of the feed-wheel 134 causes the corresponding movement of the tappet-arm 185 out of contact with the rocker-arm 184, which enables the spring 190 to move the member 188 into retracted position, thereby permitting the nose 179 of the latch-plate to descend in front of the nose 189 of the member 188 for a succeeding tripping operation. The feed-wheel 134 having continued its step-by-step advance feeding movement for the side stitching operation, and the stitching mechanism having been rotated for stitching the eye portion of the buttonhole, the feed-wheel performs its reverse retrograde-feeding movement, at the completion of which the tappet-arm 185 engages the rocker-arm 184, thereby forcing the nose 189 of the member 188 into contact with the forward edge of the nose 179 of the latch-plate, by means of which the angle-lever 162 164 is turned to raise the cam-member 161 out of engagement with the lug 160, thus effecting the operative engagement of the crank-disk 28 with its actuating worm 26 and causing the same to perform a single rotation, as previously described. As the latch-plate 176 is carried forward, the engagement of the beveled edge of its nose-piece 179 with the stripper-finger 181, after the release of the worm-section 163, to disengage the latch-plate nose 179 from the nose 189 of the rocker-arm extension 188, permits the angle-lever 162 164 to be promptly returned by means of the spring 165 to initial position for reëngagement with the lug 160 of the worm-wheel section for interruption of the rotation of the crank-wheel 28 after having imparted a single cutting action to the buttonhole cutting devices.

As herein shown and described, the machine is provided with a reciprocating and laterally jogging needle 194 secured in the vibratory needle-clamp 195 mounted at the lower end of the needle-bar 196 which is journaled in a rotary bushing 198, complemental stitch-forming mechanism being sustained upon a rotary loop-taker support 199. The needle-bar bushing and loop-taker frame bushing are provided with any suitable or usual means for imparting step-by-step semi-rotations thereto in unison during the stitching of the eye portion of the buttonhole and for returning the same to initial position, and the requisite coöperating thread-controlling means are provided to insure the proper handling of the threads in producing the covering overseam stitches along the sides and around the eye of the buttonhole preparatory to the cutting operation.

From the foregoing description it will be seen that the characteristic feature of the present improvement is the construction and arrangement of the buttonhole cutting means in a machine frame having upper and lower members embracing the cutting position in such manner that the thrust of the upper and lower cutter-members upon each other is transmitted directly, and in substantially a straight line passing through the cutters, to the upper and lower members of the frame, thereby obviating any springing or bending of the moving parts and insuring the positive action of the cutter-members upon the work regardless of the material of which it is made. It will therefore be seen that the improvement is susceptible of very material modification from the embodiment herein shown and described without departure from the scope of the present invention.

Having thus set forth the nature of the invention, what we claim herein is:—

1. In a buttonhole sewing machine, the combination with the frame comprising rigidly connected upper and lower members, and an intermediate work-support, of buttonhole cutting mechanism comprising upper and lower cutter-members, carriers therefor, and cutter-actuating means including a plurality of members movable into and out of alinement with said cutter-members and forming, when in such alined relation, direct composite braces or stays between said cutters and their respective frame-members to provide at the completion of each cutting action a direct and continuous connection between, and to transmit the thrust of the cutting operation to, the upper and lower frame-members.

2. In a buttonhole sewing machine, the combination with the frame comprising rigidly connected upper and lower members, and an intermediate work-support, of buttonhole cutting mechanism comprising upper and lower cutter-members, carriers therefor, and automatically acting cutter-actuating means including a plurality of members movable into and out of alinement with said cutter-members and forming, when in such alined relation, direct composite braces or stays between said cutters and their respective frame-members to provide at the completion of each cutting action a direct and continuous connection between, and to transmit the thrust of the cutting operation to, the upper and lower frame-members.

3. In a buttonhole sewing machine, the combination with the frame comprising rigidly connected upper and lower members, and an intermediate work-support, of buttonhole cutting mechanism comprising upper and lower cutter-members, carriers for the same, and cutter-actuating means including members interposed between each of said cutter-carriers and one of the frame-members and movable into substantial alinement for forcing the cutter-members together and transmitting directly to the frame-members the full compressive force of the cutting action.

4. In a buttonhole sewing machine, the combination with the frame comprising integral upper and lower members, and an intermediate work-support, of buttonhole cutting mechanism comprising upper and lower cutter-members, pivotally mounted carriers for the same, and cutter-actuating means including members interposed between each of said cutter-carriers and one of the frame-members and movable into substantial alinement for forcing the cutter-members together and transmitting directly to the frame-members the full compressive force of the cutting action.

5. In a buttonhole sewing machine, the combination with a rotary driving member, and stitch-forming and feeding mechanisms deriving operative movements therefrom, of cutting mechanism comprising upper and lower cutter-members, carriers therefor, normally ineffective actuating mechanism adapted for connection with the driving member independently of the latter's connections with the stitch-forming and feeding mechanisms and adapted to impart operative movements to the upper cutter-carrier, means connected with the upper cutter-carrier independently of said actuating means for operating the lower cutter-carrier, and automatically controlled means for establishing and interrupting the operative relation between said driving member and the actuating mechanism for the upper cutter-carrier.

6. In a buttonhole sewing machine, the combination with the frame and a work-plate mounted thereon, of cutting mechanism comprising upper and lower cutter-members, an upper-cutter carrying lever fulcrumed upon said frame and having an arm extending below said work-plate, a carrier for the lower cutter-member, means connected with said carrying lever above the work-plate for imparting operative movements thereto, and a connection below the work-plate between said carrying lever and the lower-cutter carrier whereby the latter is operated.

7. In a buttonhole sewing machine, the combination with the frame and a work-plate mounted thereon, of cutting mechanism comprising upper and lower cutter-members, an upper-cutter carrying lever fulcrumed upon said frame and having an arm extending below said work-plate, a carrier for the lower cutter-member, a traveling support for the lower-cutter carrier, actuating means for said carrying lever, a connection between said carrying lever and said traveling support for moving the lower cutter into and out of register with the upper cutter, and an independent connection between the carrying lever and the lower-cutter carrier for moving the lower cutter toward and from the upper cutter.

8. In a buttonhole sewing machine, the combination with the work-plate and the frame having a seat beneath the same, of cutting mechanism comprising upper and lower cutter-members, carriers therefor, a thrust-sustaining block adapted for movement to and from a position intermediate the lower-cutter carrier and the seat of said frame beneath the operative position of said cutter, actuating means for said cutters, and means independent of said actuating means for imparting operative movements to said thrust-sustaining block.

9. In a buttonhole sewing machine, the combination with the work-plate and the frame having a seat beneath the same, of cutting mechanism comprising upper and lower cutter-members, carriers for said cutter-members upon which they are adapted to coöperate above said seat, a thrust-sustaining block adapted for movement to and from a position intermediate the lower-cutter carrier beneath the lower cutter and the seat of said frame, actuating means applied to the upper-cutter carrier, and independent operative connections between said upper-cutter carrier and the lower-cutter carrier and thrust-sustaining block, respectively, for successively actuating the same.

10. In a buttonhole sewing machine, the combination with the work-plate and the frame having a seat beneath the same, of cutting mechanism comprising upper and lower cutter-members, carriers for said cutter-members upon which they are adapted to coöperate above said seat, a traveling support for the lower-cutter carrier, a thrust-sustaining block adapted for movement to and from a position intermediate the lower-cutter carrier beneath the lower cutter and the seat of said frame, actuating means applied to the upper-cutter carrier, independent operative connections between the upper-cutter carrier and the lower-cutter carrier support and thrust-sustaining block, respectively, for actuating the same, means for successively interrupting said operative connections while said actuating means continue to operate, and means connected with the upper-cutter carrier for operating the lower-cutter carrier to move the lower cutter-member toward and from the upper cutter-member.

11. In a buttonhole sewing machine, the combination with a work-plate and the frame having a seat beneath the same, of cutting mechanism comprising upper and lower cutter-members, carriers for said cutter-members upon which they are adapted to coöperate above said seat, a traveling support for the lower-cutter carrier, a thrust-sustaining block adapted for movement to and from a position intermediate the lower-cutter carrier beneath the lower cutter and the seat of said frame, actuating means applied to the upper-cutter carrier, independent operative connections between the upper-cutter carrier and the lower-cutter carrier support and thrust-sustaining block, respectively, for actuating the same, means for successively interrupting said operative connections while said actuating means continue to operate, means connected with the upper-cutter carrier for operating the lower-cutter carrier to move the lower cutter-member toward and from the upper cutter-member, and means for locking the lower-cutter carrier-support and the thrust-sustaining block in operative position.

12. In a buttonhole sewing machine, the combination with the work-plate and the frame supporting the same, of cutting mechanism comprising a rock-shaft, a rock-lever fixed thereon and having lateral and depending arms extending respectively above and below the work-plate, an upper cutter-member carried by the lateral arm of said rock-lever, a cam mounted upon said rock-shaft, a traveling support, a second rock-lever fulcrumed thereon and having a forwardly extending arm and a rearwardly extending arm adapted for operative engagement by said cam, a lower cutter-member carried by the forwardly extending arm of the second-named rock-lever, an operative connection between the depending arm of the first-named rock-lever and said traveling support whereby the lower cutter-member is moved laterally into and out of register with the upper cutter-member, and means for actuating said rock-shaft.

13. In a buttonhole sewing machine, the combination with the work-plate and the frame supporting the same, of cutting mechanism comprising an upper cutter-member, a carrier therefor, actuating means for said upper cutter, a lower cutter-member, a carrier therefor, a rock-shaft, means carried by said rock-shaft for imparting to the lower-cutter carrier movements transverse to those of the upper cutter-member, a crank-arm fixed upon said rock-shaft, a swinging arm having laterally extending therefrom a clutch-pin and a guide-pin, and a link pivotally connected at one end with said crank-arm and provided with a notched member adapted to embrace said clutch-pin and a cam-slot embracing said guide-pin, whereby the latter operates the link to disengage it from said clutch-pin.

14. In a buttonhole sewing machine, the combination with the work-plate and the frame supporting the same, of cutting mechanism comprising an upper cutter-member, a carrier therefor, actuating means for said upper cutter, a lower cutter-member, a carrier therefor, a rock-shaft, means carried by said rock-shaft for imparting to the lower-cutter carrier movements transverse to those of the upper cutter-member, a crank-arm fixed upon said rock-shaft, a swinging arm having laterally extending therefrom a clutch-pin and a guide-pin, a tilting lever carrying a locking pin and fulcrumed adjacent the free end of said swinging lever and formed with a cam edge adapted for engagement by the latter in its operative movements, and a link pivotally connected at one end with said crank-arm and provided with a notched member adapted to embrace said clutch-pin, a cam-slot embracing said guide-pin and having a curvature eccentric to the axis of movement of said swinging arm, and a notch adapted to receive the locking pin of said tilting lever when it becomes disengaged from said clutch-pin.

15. In a buttonhole sewing machine, the combination with the work-plate and the frame having a seat beneath the same, of cutting mechanism comprising an upper cutter-member, a carrier therefor, actuating means for said upper cutter, a lower cutter-member, a carrier therefor, a rock-shaft, means carried by said rock-shaft for imparting to the lower-cutter carrier movements transverse to those of the upper-cutter member, a thrust-sustaining block adapted for interposition between said carrier and the seat of said frame, a loose sleeve upon said rock-shaft, a connection between said loose sleeve and the thrust-sustaining block for moving the latter transversely to the movements of the cutter-carrier support, crank-arms fixed respectively to said rock-shaft and loose sleeve, a swinging arm having laterally extending from both its opposite faces a clutch-pin and a guide-pin, and links each pivotally connected with one of said crank-arms and provided with a notched member adapted to embrace said clutch-pin and a cam-slot embracing said guide-pin, whereby the latter operates the link to disengage it from said clutch-pin, the cam-slots of said links being disposed in angular relation.

16. In a buttonhole sewing machine, the combination with the work-plate, a traveling work-holder supported thereby, stitch-forming mechanism, and means for producing relative feeding movements between the work-holder and the stitch-forming mechanism, of buttonhole cutting mechanism comprising upper and lower cutter-members, a carrier for the upper cutter-member, actuating means for imparting to the upper cutter-member operative movements relatively to the lower cutter-member, and means connected with the upper cutter-member independently of said actuating means for retracting the work-holder out of initial operative relation with the stitch-forming mechanism for each button-hole cutting operation and thereafter returning it to initial position.

17. In a buttonhole sewing machine, the combination with the work-plate, a traveling work-holder supported thereby, stitch-forming mechanism and feeding mechanism including an actuating member and a connection between the same and the work-holder comprising an endwise-movable sectional bar having a transversely movable section pivotally connected with adjacent sections, of buttonhole cutting mechanism comprising upper and lower cutter-members, cutter-actuating means, and means connected with said cutter-actuating means for imparting to the laterally movable section of the connecting bar transverse movements to shift the work-holder independently of said feeding mechanism.

18. In a buttonhole sewing machine, the combination with the work-plate, a traveling work-holder supported thereby, stitch-forming mechanism and feeding mechanism including an actuating member and a connection between the same and the work-holder comprising an endwise-movable sectional bar having a transversely movable section pivotally connected with adjacent sections, of buttonhole cutting mechanism comprising upper and lower cutter-members, a rock-lever upon which the upper cutter-member is mounted, a rock-shaft upon which said rock-lever is mounted, a shift bar formed with a slideway embracing the laterally movable section of said connecting bar, and an operative connection between said rock-shaft and the shift bar whereby said laterally movable section of the connecting bar is moved bodily transversely of the direction of its normal feed-transmitting movements.

19. In a buttonhole sewing machine, the buttonhole cutting mechanism comprising upper and lower cutter-members, a reciprocating carrier for one of said cutter-members, a continuously driven actuating gear, a peripherally toothed gear-wheel sustained in operative relation with said actuating gear and constructed with a spring-pressed radially movable toothed section, an operative connection between said peripherally toothed gear-wheel and said reciprocating carrier, retracting means for maintaining said section normally disengaged from said actuating gear, and means for shifting said retracting means into and out of operative relation with the toothed section of said gear-wheel.

20. In a buttonhole sewing machine, the buttonhole cutting mechanism comprising upper and lower cutter-members, a reciprocating carrier for one of said cutter-members, a continuously driven actuating gear, a peripherally toothed gear-wheel sustained in operative relation with said actuating gear and constructed with a spring-pressed radially movable toothed section provided with a lateral shoulder, an operative connection between said peripherally toothed gear-wheel and said reciprocating carrier, a reciprocatory controlling member having a cam portion inclined to the path of movement of and adapted to engage the shoulder of the toothed gear-section to disengage the same from the actuating gear, and means for shifting said reciprocatory cam member into and out of operative relation with the shoulder of said toothed gear-section.

21. In a buttonhole sewing machine, the buttonhole cutting mechanism comprising upper and lower cutter-members, a reciprocating carrier for one of said cutter-members, a continuously driven actuating gear, a peripherally toothed gear-wheel sustained in operative relation with said actuating gear and constructed with a spring-pressed radially movable toothed section provided with a lateral shoulder, an operative connection between said peripherally toothed gear-wheel and said reciprocating carrier, an angle-lever mounted upon a fixed fulcrum and having one arm formed with a cam portion inclined to the path of movement of and adapted to engage the shoulder of the toothed gear-section to disengage the same from the actuating gear, and a second arm provided with a spring-actuated latch-plate, a tripping lever adapted for operative engagement with said latch-plate for shifting the said angle-lever to disengage its cam portion from the toothed gear-section, a stripper for retracting said latch-plate from engagement with the tripping lever, and means for actuating said tripping lever.

22. In a buttonhole sewing machine, the combination with a traveling work-holder and feeding mechanism therefor including a feed-wheel and a reciprocally movable shaft upon which the same is mounted, of cutting mechanism comprising upper and lower cutter-members, a reciprocating carrier for one of said cutter-members, a continuously driven actuating gear, a peripherally toothed gear-wheel sustained in operative relation with said actuating gear and constructed with a spring-pressed radially movable toothed section, an operative connection between said peripherally toothed gear-wheel and said reciprocating carrier, retracting means for maintaining said section normally disengaged from said actuating gear, and means for shifting said retracting means into and out of operative relation with the toothed section of said gear-wheel and including a tripping rock-lever in operative relation with said retracting means, and a tappet-arm fixed upon the feed-shaft and movable into and out of operative relation with the tripping rock-lever as the work-holder approaches and recedes from extreme initial position.

In testimony whereof, we have signed our names to this specification, in the presence of two subscribing witnesses.

JAMES G. GREENE.
   LOUIS F. A. BÜCHNER.

Witnesses:
 HENRY J. MILLER,
 HENRY A. KORNEMANN, Jr.